June 17, 1969     S. A. GUERRIERI     3,450,506

APPARATUS FOR THE PRODUCTION OF HYDROGEN

Filed July 23, 1964

INVENTOR.
SALVATORE A. GUERRIERI
BY Flynn, Marn & Jangarathis
ATTORNEY 3,450,506
APPARATUS FOR THE PRODUCTION OF HYDROGEN Salvatore A. Guerrieri, Rowayton, Conn., assignor to The Lummus Company, New York, N.Y., a corporation of Delaware
Filed July 23, 1964, Ser. No. 384,704
Int. Cl. B01j 9/04; G01b 2/16
U.S. Cl. 23—288                    6 Claims

ABSTRACT OF THE DISCLOSURE

An improved steam reforming apparatus with reactor tubes having an outside diameter less than 2½ inches and an inner diameter between ¼ inch and 2¼ inches, the inner surface of the tubes having a nickel oxide steam reforming catalyst integrally coated thereon.

---

This invention relates, in general, to a new improved apparatus for use in a process for catalytic reactions involving the application of heat to gases and vapors. More particularly, it relates to apparatus adapted to produce gas, rich in free hydrogen from a hydrocarbon gas and steam, or from a hydrocarbon gas and other compounds containing oxygen which can react with the carbon of the hydrocarbon.

In reacting hydrocarbon gases with steam to produce hydrogen, it is desirable to use high temperature, e.g., up to 2000° F. Although special metal tubes packed with catalyst are known to the art, the economics of the use of such tubes and catalyst still leave much to be desired. The catalyst in most common current use is nickel oxide, supported on inert pellet carriers, in the shape of spheres or cylinders ranging in size from ¼ inch to ¾ inch. These pellets have generally been installed in tubes varying from 3 inches to 8 inches in diameter vertically disposed in the combustion chamber of a furnace. Methane and other hydrocarbons have been reacted or reformed with steam at the elevated temperatures in contact with the "reforming catalyst" to produce free hydrogen mixed with carbon dioxide, carbon monoxide, and contaminated with more or less unreacted hydrocarbon, and trace amounts of other constituents.

The apparatus currently used for catalytic reactions of the type described operates at temperatures ranging from 1400° F. to 1800° F. at the outlet, and pressures up to 350 pounds per square inch. The capacity of these steam reformers, as such devices are generally called, is limited primarily by the allowable space velocity and by the attainable heat flux through the tube and into the fluid, since the reaction is endothermic. The space velocity is limited by the permissible operating pressure and pressure drop, whereas the attainable heat flux is limited by the tube size or the ratio of tube surface to volume. In the case of catalyst filled tubes, there are definite, practical upper and lower limits of tube diameter.

Generally speaking, large diameter tubes are impractical; the larger the diameter, the poorer the radial temperature profile is, because of the distance that the heat must flow from the tube wall to the center of the tube. The effect of this poor radial temperature profile is a loss in capacity and yield. The larger the tube is, the smaller the permissible pressure and, therefore, capacity, due to limitations imposed by available materials of construction. Therefore, the practice over the years has been a gradual shift towards smaller diameter tubes.

On the other hand, with catalysts of the size now in general use, there is also a lower limit on tube diameter which is set by an acceptable ratio of tube to catalyst size. This must be such that the catalyst will be uniformly but randomly arranged in the tube so as to avoid channeling of the process gas; present practice is to use tubes 3 to 4 inches in diameter. Such tubes, though smaller than used formerly, do have the same limitations of heat flux and capacity discussed hereinabove. Reformer design based on the concept of catalyst filled tubes has thus reached the ultimate in capacity, barring a great change in the size of the catalyst pellets which might bring about somewhat smaller tubes. This is, however, unlikely, due to the rapid increase in pressure drop which comes from the use of smaller pellets.

The use of tubular catalyst liners in the tubes of a steam reformer is also known in the art. However, these tubular liners must of necessity leave a small air gap between the inner diameter of the tube and the outer diameter of the catalyst. In a steam reforming reactor, the heat necessary to carry out the endothermic reaction must flow from the heated chamber where the tubes are located through the metal tube wall, through the gap between the tube wall and the catalyst liner, through the catalyst material itself and, finally, into the reacting mixture. Since the heat required for reforming reactions as described herein is quite high, it should be obvious to those skilled in the art that a substantial temperature drop will occur as the heat flows through the various barriers described above. Due to the desirability of maintaining relatively high temperatures within the tube in order to get good yield, the capacity of the reactor is essentially limited by the maximum pressure and temperature to which the metal tube may be subjected. Anything that can be done to bring the metal tube wall temperature and the reactants' temperature closer together improves the process conditions and therefore the economy of the process.

Therefore, it is the general object of this invention to avoid and overcome the foregoing and other difficulties of prior art practices by the provision of a new and better steam reforming apparatus.

Another object of this invention is to provide an improved apparatus for catalytic reactions involving the application of heat to liquids, gases and vapors, particularly to the art of producing gases rich in free hydrogen from hydrocarbon gas and steam or other compounds containing oxygen which will substantially eliminate radial temperature gradients.

A further object of this invention is the provision of a new and better steam-hydrocarbon reformer in which higher heat fluxes are obtained than were formerly possible.

Still another object of this invention is the provision of a new and better steam-hydrocarbon reformer in which maximum possible space velocities are obtained.

A still further object of this invention is the provision of a new and better steam-hydrocarbon reformer which is less expensive to manufacture and more simple to service than the prior art apparatus.

Other objects and advantages of the present invention will be made clear in the course of the following description of several embodiments thereof, and the novel features will be particularly pointed out in connection with the appended claims.

For the purpose of illustrating the invention, reference is made to the accompanying drawings of an embodiment of the invention, it being understood, however, that this invention is not limited to the precise arrangements and instrumentalities shown.

Figure 1:
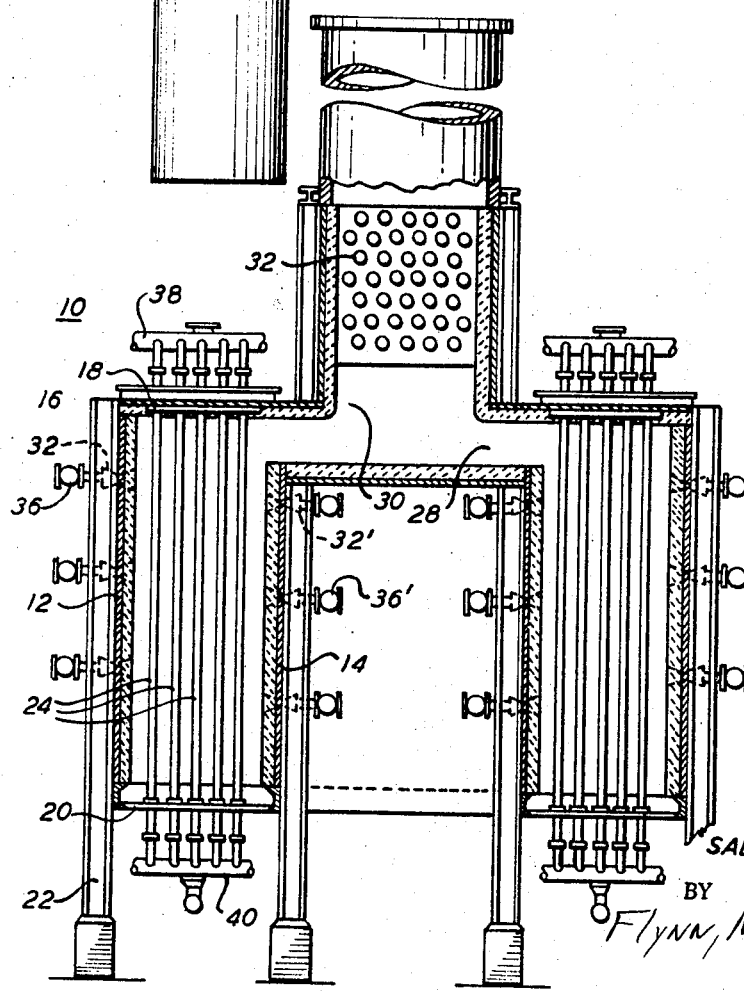
FIGURE 1 is a cross-sectional view of a steam-hydrocarbon reformer which may employ the principles of the present invention.

A typical furnace for producing hydrogen in a steam reformer is shown in FIGURE 1 and generally designated by the numeral 10. The steam reformer 10 is supported by suitable structural framing 22. Mounted upon said framing is an annular chamber 16 which comprises outer wall 12, inner wall 14, upper ring 18 and bottom ring 20, all of which are suitably refractory lined. Vertically positioned radially extending tubes 24 are located within chamber 16, and connect with inlet conduit 38 above ring 18 and outlet conduit 40 below ring 20. As noted hereinbelow, tubes 24 are provided with an integrally bonded catalytic inner surface.

Burners 32 are placed between adjacent radial tubes 24 on outer wall 12, and burners 32' are similarly placed on inner wall 14, burners 32 and 32' being placed so that individual burners do not directly face each other.

In operation, process fluids, typically methane and steam, are introduced through inlet conduit 38 into process tubes 24 where, in the presence of the catalyst liner, they are subjected to heat from the combustion of fuels supplied by burners 32 and 32'. Reaction proceeds within tubes 24 and the reaction products are withdrawn through outlet conduit 40. Within annular chamber 16, the generated combustion gases are exhausted through radial ducts 28 at the upper end thereof. The ducts 28 extend to the convection unit 32 en route to the stack 30. The burners 32 and 32' are regulated by suitable valves 36 and 36', respectively, to controllably vary heat to the tubes 24. In a steam reformer, it is desirable to apply heat in accordance with the requirements of the reaction kinetics at all locations within the tubes. Accordingly, the top burners 32 and 32' should be regulated to meet these requirements.

The steam reformer 10 has certain inherent advantages due to the annular configuration of the furnace. In addition, the ability to control the heat uniformly over the length of the tubes 24 in enhanced by the fact that the burners 32' can be placed on the inner wall 14 without difficulty and in fact, these burners enable a uniform heat transfer to be achieved to all of the tubes 24 independent of their radial position within the chamber 16. It should further be noted that two rows of staggered tubes can be utilized if desired. The positioning of the burners 32 and 32' between adjacent groups of tubes 24 insures uniform heating to all of the tubes in each radial grouping whether it consists of a single row or two rows. In practice, the particular design of a reformer for use with the present invention is a matter of choice.

The tube banks 24 are supplied a steam-fuel gas mixture through the upper inlets 38 and the products of the steam-fuel gas reforming process are removed through the bottom outlet pipes 40.

If methane is the gas supplied to the inlet pipe 38, the steam reforming apparatus 10 follows one or both of the following reactions:

(1)
$$CH4+2H_2O=4H_2+CO_2$$

and (2)
$$CH4+H_2O=CO+3H_2$$

Both of these reactions are endothermic and are at present carried out at temperatures in the range of from 1400° to 1800° F. in the presence of catalysts. Reaction (1) is considered to be reaction (2) followed by (3)
$$CO+H_2O=CO_2+H_2$$

Thus, the resultant products of the process are determined by the ratio of the mols of steam to the mols of methane.

As was stated hereinabove, the capacity of the steam reformer is limited primarily by the allowable space velocity and by the obtainable heat flux through the tube wall and into the steam-hydrocarbon mixture flowing through the tube. The space velocity is limited by the permissible operating pressure and the obtainable heat flux is limited by the tube size or the ratio of tube surface to volume. In the past, catalyst filled tubes had defined practical upper and lower limits to tube diameters.

The present invention overcomes these limitations by replacing the catalyst pellet-packed tubes with open tubes of small diameter, constructed of such material that the inner wall of the tube itself becomes the catalyst. For purposes of the present invention, a small diameter tube is one having an outer diameter less than approximately 2½ inches, and an inner diameter of less than approximately 2¼ inches.

In FIGURT 2, there is shown a tube 24 which is constructed of an alloy suitable for the temperature, pressure and heat flux conditions of furnace 10. The inner surface 42 of the tube 24 has a nickel oxide coating integrally bonded thereon. The inside diameter of tube 24 may range between about ¼ inch and 1½ inches depending upon the economics of a particular situation. It will be obvious, of course, that with a smaller diameter tube it is possible to employ greater pressures and temperatures than with larger tubes, due to the greater strength of the smaller tubes.

Further, if alloy tube 24 is a nickel alloy tube such as "Inconel" or other suitable nickel bearing alloy, the nickel oxide coating 42 can be formed by the oxidation of the surface layer of the nickel component of the tube wall. The nickel oxide coating can also be achieved by oxidation if the tube 24 is a nickel tube, a nickel tube strengthened by various oxides, or an alloy tube having a nickel coated inner surface. Other methods of achieving the integral bonding of the catalyst to the tube wall, including, for example, electrolytic and diffusion methods, will be obvious to those skilled in the art.

Figure 2:
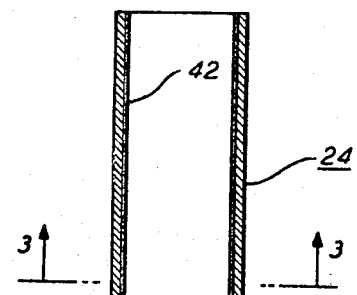
FIGURE 2 is a cross-sectional view of one of the tubes utilized in the apparatus of FIGURE 1.
Figure 3:
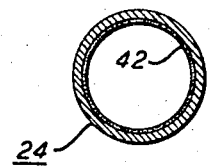
FIGURE 3 is a cross-sectional view taken along lines 3—3 of FIGURE 2.
Figure 4:
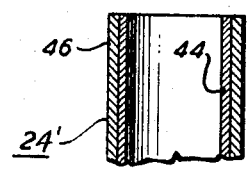
FIGURE 4 is a cross-sectional view, similar to FIGURE 2, of a second embodiment of the present invention.

As one alternative, the tube 24 can be replaced by a tube 24' shown in FIGURE 4, which tube is a bimetallic comprising an inner nickel or nickel alloy tube 44 and an outer shell of alloy 46 especially suited for the temperature-pressure and heat flux conditions required to be met within the steam reformer apparatus 10. Of course, such a composite tube must be constructed with materials having similar coefficients of expansion so as to avoid separation at one end of the temperature range.

It has been determined that tubes of the general size contemplated herein provide a turbulent flow of reactants and reaction products, due primarily to the high velocity of the gases passing therethrough. This turbulent flow results in a negligible radial temperature gradient within the fluid stream. In certain installations, however, it may be desired to use either somewhat larger tube diameter or slower gas velocity, in which case turbulence promoters may advantageously be inserted in the tubes so as to prevent laminar flow. These may be of either metal or ceramic material and may be inert or catalytic, depending on design considerations.

The advantages for the use of the open tubes of small size according to the present invention are:

(1) The catalytic reaction occurs at the tube wall where the catalyst is located and heat needs to flow only through the tube wall to reach the reactants. Thus, heat is supplied where it is needed and radial temperature gradients, except at the tube wall, are practically nonexistent.

(2) Maximum possible heat fluxes are thus obtainable because of minimum temperature gradients.

(3) Maximum possible space velocities are obtainable due primarily to the higher temperatures and pressures which are possible with small tubes and, secondarily, to the elimination of catalyst packings.

(4) The use of small diameter tubes substantially lowers the cost of manufacturing the steam reforming apparatus, since thinner tube walls may be employed for the same pressure/temperature conditions.

It will be understood that the embodiments of the invention set forth above are illustrative only and that various changes in the steps, materials and arrangements of parts may be made by those skilled in the art within the scope of the invention as defined in the claims appended hereto. In particular, it will be noted that while the use of a single catalyst has been described hereinabove, combinations of catalysts or a catalyst and a catalytic promoter may be employed in a given instance. In like fashion, one skilled in the art will recognize that the apparatus of the invention is applicable to substantially any endothermic catalytic reaction, the reforming reaction described being purely illustrative of this class of reactions.

I claim as my invention:

1. An improved steam reforming apparatus comprising:
   a furnace housing;
   a reaction tube within the housing having an outer diameter less than about 2½ inches and an inner diameter between about ¼ inch and about 2¼ inches, the inner surface of the tube having a nickel oxide steam reforming catalyst integrally coated thereon said catalyst being the sole catalyst contacting reactants in the tubes;
   inlet means for introducing reactants into the reaction tube;
   outlet means for withdrawing reaction products from the reaction tube; and
   heating means within the housing for heating the reactants in the reaction tube to the steam reforming reaction temperature.

2. The apparatus as claimed in claim 1 wherein the reaction tube is formed of an alloy capable of withstanding high temperature and pressure conditions.

3. The apparatus as claimed in claim 1 and further comprising turbulence promotion means within the interior of the tube.

4. An improved steam reforming apparatus comprising:
   an annular furnace housing;
   a plurality of vertical reaction tubes positioned in radially extending rows within the housing said tubes having an outer diameter less than about 2½ inches and an inner diameter between about ¼ inch and about 2¼ inches, the inner surface of the tubes having a nickel oxide steam reforming catalyst integrally coated thereon, said catalyst being the sole catalyst for contacting reactants within the tubes;
   inlet means for introducing reactants into the reaction tubes;
   outlet means for withdrawing reaction products from the reaction tubes; and
   burner means positioned in inner and outer walls of said annular housing between adjacent radial rows of reaction tubes.

5. The apparatus as claimed in claim 4 wherein the reaction tube is formed of an alloy capable of withstanding high temperature and pressure conditions.

6. The apparatus as claimed in claim 4 and further comprising turbulence promotion means within the interior of the tube.

References Cited

UNITED STATES PATENTS

| | | | |
|---|---|---|---|
| 2,206,685 | 7/1940 | Balachowsky | 23—288.92 XR |
| 2,393,778 | 1/1946 | Hull | 23—288 XR |
| 2,526,657 | 10/1950 | Guyer | 23—288.92 XR |
| 2,904,400 | 9/1959 | Asendorf et al. | 23—288.92 XR |
| 3,172,739 | 3/1965 | Koniewiez | 23—288 |

MORRIS O. WOLK, *Primary Examiner.*

M. D. BURNS, *Assistant Examiner.*

U.S. Cl. X.R.

23—288.92; 48—196